Patented Sept. 27, 1949

2,482,742

UNITED STATES PATENT OFFICE 2,482,742

METHOD FOR ACTIVATION OF CATALYTIC METAL SCREENS

Edward H. Carter and Louis E. Sartain, Kingsport, Tenn., assignors to Eastman Kodak Company, Rochester, N. Y., a corporation of New Jersey No Drawing. Application May 17, 1947, Serial No. 748,843

5 Claims. (Cl. 252—476)

This invention relates to an improved catalyst for use in the conversion of organic hydroxy compounds to carbonyl derivatives. More particularly, this invention is concerned with an improved copper-silver compacted screen type catalyst particularly useful in processes for the conversion of ethyl alcohol to acetaldehyde.

As shown by various publications, such, for example, as Industrial Catalysis by Green (1928), pages 386 and 387, in the past copper and silver-containing catalysts have been used industrially in dehydrogenation reactions, such as in the conversion of methyl alcohol to formaldehyde. As shown in the Catalytic Oxidation of Organic Compounds in the Vapor Phase by Marek and Hahn (1932), pages 44 and 45, the catalytic activity of such catalysts diminishes after a certain period and heretofore restoration of activity has been accomplished by oxidation of the catalyst with hot air. In the industrial use of this type of catalyst it has been customary to obtain a relatively pure metal such as substantially pure copper or silver and fabricate the catalyst from these materials. The catalyst has heretofore been fabricated into various forms and sizes, including pellets and screens.

In the prior use of a catalyst, such, for example, as a copper or silver screen catalyst fabricated from a good-grade of metals, it has been observed that, in some instances, the new catalyst, when inserted in the catalytic converter, might start to function very easily, whereas in other instances it required much longer periods of ancillary heating before the catalyst attained sufficient temperature to function self-sufficiently. Also in the operation of such prior art catalyst, while at the onset of the process the catalyst gave good conversion, after a period of operation, which might not be constant or uniform for each catalyst, a decrease of efficiency was indicated, this being evidenced by reduction in the amount of conversion per pass and/or by an increase in the decomposition products in the effluent materials. In other words, considering specifically the treatment of ethyl alcohol in contact with a catalyst, in prior art operation, using the usual untreated copper and/or silver catalyst, in some instances the percentage of acetaldehyde in the effluents dropped 10% or 15% after the catalyst had been used for a relatively short period. Also, in some instances decomposition increased after extended usage, as indicated by an increase in the carbon monoxide and carbon dioxide contents of the effluent gases from less than one per cent up to several per cent.

Furthermore, in the processing of hydroxy compounds, such as the conversion of ethyl alcohol to acetaldehyde and involving contact of these materials with copper and/or silver catalyst, it has been observed that both the conversion and the amount of decomposition resulting from the use of a catalyst derived from a given source are likely to differ from the conversion and decomposition obtained with a similar catalyst derived from a different source. Likewise, while one catalyst might operate for several months, in the instance of another catalyst, presumably from similar materials and constructed in the same physical form, the amount of decomposition products in the effluents might increase to such a value that the efficiency of the process would be impaired in that too great a portion of the feed materials would be decomposed to carbon monoxide and carbon dioxide.

We have found, in accordance with the invention described in detail herein, that an improved type of catalyst may be prepared which is highly advantageous in that the catalyst is more uniform and the results obtained therefrom more consistent. Also our catalyst, newly charged into a converter, permits relatively fast starting of the converter and operation over longer periods of time than heretofore and without the quantity of decomposition products increasing to an undesired value. We have found that our process of preparing and assembling the improved catalyst described herein may be applied, not only to new catalyst material, but also that old, or used, catalyst material treated in a comparable manner may be restored to activity and uniformity repeatedly with results which are comparable to those obtained with new catalyst material which has initially been treated in accordance with the present invention.

This invention accordingly has for one object to provide an improved catalyst material particularly suitable for use in converting organic hydroxy compounds to carbonyl compounds. A further object is to provide an improved copper and/or silver catalyst which is easier to use than similar known catalysts when initiating a reaction, gives more uniform and duplicable operation, and has extremely long life. A still further object is to provide an improved copper and silver compressed-screen type of catalyst. Another object is to provide a method of rendering more uniform and efficient a metallic screen type catalyst, which has been used. Still another object is to provide a method of treating catalyst screens wherein the metal comprising the screens may have been obtained from various sources or is of various conditions of purity, to obtain catalytic material that is relatively uniform as indicated by duplicable results when the catalyst materials are used in parallel converters. A further object is to provide an improved and relatively uniform process for converting lower aliphatic alcohols to their corresponding carbonyl derivatives. A specific object of the invention is to provide an improved process for converting ethyl alcohol to acetaldehyde. Other objects will appear hereinafter.

These objects are accomplished by the following invention which is based upon the discovery that by treating either a new catalyst or used catalyst screen by an annealing process described in detail herein that the catalyst screens may be greatly improved, as evidenced by more uniform results and less decomposition products in the effluents in process of using said catalyst screens, even after much longer periods of catalyst utilization than heretofore employed in the prior art. It will be observed that our method of heat treatment is considerably different than the methods referred to above of treating catalytic material with blasts of hot air or other oxidizing media. It is also different than the treatment of catalytic screens with a blowtorch and the like in that such prior treatments with heating may give catalyst screens of nonuniform activity. That is, catalyst screens treated with blowtorches and welding torches may tend to develop hot spots on the surface, which spots may be overactive at some points, thereby causing greater losses, probably through decomposition of feed material to carbon monoxide and carbon dioxide at the hot spots in subsequent use of the screens so treated, as well as otherwise contributing to uneven temperature conditions over the surface of the catalyst.

We have found that catalytic material of the class described, either new or used catalyst screens, for example, may be materially improved by a system of heating or annealing said catalyst screens over a period of preferably more than three hours and usually not longer than fifteen hours and for a temperature and period which is insufficient to soften the catalyst. Usually a temperature of from about 700° F. to not greater than about 1500° F. is satisfactory, namely, a temperature which, depending upon the length of the heating, would not be high enough to unduly soften the catalyst. We have found it preferable to employ several alternate layers of catalyst screens, as described in detail hereafter and, after the catalyst screens have been properly heated in accordance with the present invention, they are preferably compacted somewhat by pressure so that the height of the alternate layers of screens is reduced by this compacting by, say, 2% to 10%. That is, if the height of the alternate catalyst screens were initially about 4 inches it would be compacted by sufficient pressure to reduce the height a fraction of an inch, or, for example, to around 3½ inches. We have further found that catalyst screens of the type described, even after they have been used a year or more, may, in accordance with the present invention, be retreated one or more times and thus restored to a condition comparable to their initial condition.

Our invention is set forth in further detail by reference to the following description of the treatment of an alternate copper and silver screen type catalyst.

A relatively good grade of copper and silver screening made up of about .06–.07" diameter wire of between 6 to 10 mesh was obtained from commercial channels. This wire was cut into a configuration corresponding to the internal configuration of the catalytic converter into which the material was to be inserted. However, before placing the screens in the converter they were given a treatment, in accordance with the present invention, as follows:

The copper screens were placed in an iron rack and likewise the silver screens were placed in another similar iron rack. The iron racks containing the screening were inserted into a cold annealing furnace so that the racks containing the catalyst screens were positioned about two feet above the bottom of the furnace. The furnace employed for the treatment was similar to the usual metallic annealing furnace and was made up of ceramic firebrick which enclosed the furnace space. The furnace was heated from the bottom by a series of burners using kerosene or other light oil as a fuel. Each burner was provided with an inlet for sufficient air (some excess) for the complete burning of the kerosene or other fuel. The bottom of the aforementioned furnace was provided with uniformly-spaced inlet ports from the burner chamber so that the combustion products passed into the interior of the furnace and around the catalyst screens contained in the racks aforementioned. The upper portion of the furnace was provided with conventional outlet ports which discharged to a stack or otherwise to the atmosphere for permitting the products of combustion to escape from the interior of the furnace.

After placing the screens in the furnace, combustion was initiated so that the inside temperature of the furnace immediately above the screens, as determined by thermocouples positioned immediately above the screens, was rapidly raised to 1,000° F. The temperature was controlled at this value, by control of the supply of fuel and oxidizing gas, for approximately seven hours. The furnace was then allowed to cool to atmospheric temperature and the screens removed. The surface of the screens was slightly oxidized and a fluffy coating of material which analyzed principally iron oxide was dusted off with a compressed air hose.

The catalyst screens thus treated were assembled in a stack comprising first several layers of silver screening, then in alternate layers, one or two layers of the copper or silver screen, until the alternate layers were stacked several inches high. This stack of catalyst was then compressed so that its initial height was reduced by approximately 2% to 6%. The compressed alternate layers of catalyst screening were then placed in the usual converter. If desired, the compressing may be accomplished in the converter.

The improved results obtained by using catalyst material so treated in accordance with the present invention will be apparent from consideration of the following examples.

*Example I*

In this example a comparison is made of the greater ease in starting up a catalyst unit containing the processed copper-silver screen of the present invention as compared with the starting time required when using an unprocessed copper-silver screen.

A catalyst unit was filled with the compressed, annealed alternate copper-silver screen catalyst, as described above, of the present invention. The particular catalyst unit used in this example contained over twenty-five alternate layers and in its compressed condition was slightly over 3" in thickness. The unit was to be operated for converting ethyl alcohol to acetaldehyde. In order to place the unit in operation it is necessary to heat the unit up to about 500° C. or such temperature as may be necessary to start operations when the alcohol and air are fed in. This auxiliary heating for starting the apparatus was accomplished by supplying the combustion products from burning producer gas to heat the catalyst screens up to sufficient temperature for initiating reaction. After a thermocouple showed a temperature from 350° C. to 450° C. within the catalyst unit a mixture of commercial ethyl alcohol and air, preheated and in a vaporous condition, was introduced into the unit below the catalyst screens. Upon contacting the catalyst that had been initially warmed by auxiliary heating, conversion of the alcohol to acetaldehyde took place. In less than one hour the unit was operating in a self-sufficient manner, the catalyst being kept up to temperature by the exothermic heat of the reaction, all auxiliary heating being cut off. Also within the hour the feed of the alcohol was increased to normal production amounts and the conversion per pass of the alcohol to acetaldehyde at the end of the hour exceeded 50%. In starting the same unit in prior instances with catalyst unprocessed in accordance with the present invention several hours were required to get the unit into operation before desired conversion was attained and the auxiliary heating could be cut off.

*Example II*

In accordance with this example a comparison was made of a unit containing the prior art type of screen with the same unit containing the present improved type of screen. The unit with the prior art type of screen operated over a period slightly greater than six months before the decomposition products, as evidenced by carbon monoxide and carbon dioxide in the effluents, exceeded a predetermined standard of 3%. In other words, when the content of the effluent gas contains more than 3% carbon monoxide and carbon dioxide, this indicated that too great a portion of the feed was being lost through decomposition and that catalyst failure, from the economic standpoint, had occurred. The unit was shut down and the catalyst screen replaced with an improved screen of the present invention. The unit was started up as described in Example I, the same type of feed and other conditions maintained as before. However, after eight months operation the regular analysis of the effluents showed that the decomposition losses had not at that time exceeded 1%. Hence, it is apparent that the life of the new catalyst is much longer than that of the older type.

*Example III*

In accordance with this example, a comparison was made of the decomposition losses over a period of approximately six months on a battery of catalyst units which had been changed over to the improved catalyst screens in accordance with the present invention, with the prior six months operation of the same units when containing the old type catalyst. In other words, all other conditions were substantially the same. This comparison showed that over 170,000 pounds of the ethyl alcohol feed was saved because the decomposition losses were that much lower. In addition the actual record of the maintenance cost on these same units was several thousand dollars lower.

*Example IV*

In accordance with this example a catalyst unit containing the old type copper-silver, unprocessed screen was shut down after eight months operation, inasmuch as the decomposition products in the effluents were greater than 3%. The unit was disassembled and the catalyst screens subjected to five hours treatment at 900° F. in a furnace, in accordance with the present invention as described above. The catalyst screens thus treated were reassembled, compressed and the unit started up in accordance with Example I. After eight months of continuous use the unit was still in operation and the analysis of the effluents showed that the decomposition products had not exceeded 2%, although the conversion per pass of alcohol to aldehyde consistently averaged greater than 35%.

At the end of eight months the unit was again shut down, the catalyst screens removed, again treated as above described, and the unit reassembled and placed in operation. The decomposition losses at the end of two months operation were below 1%, thereby showing that the catalyst may be repeatedly treated by the procedure of the present invention.

While in the foregoing examples, for convenience of illustration, our invention has been described by reference to the conversion of ethyl alcohol to acetaldehyde, in a similar manner propyl alcohol, butyl alcohol and other organic hydroxy compounds may be converted to their corresponding carbonyl compounds. In other words, the catalyst of the present invention may be employed in processes such as those described in Hasche U. S. Patent 2,173,111, or the like. It will also be kept in mind that the present type catalyst may be employed in the converting of secondary alcohols to ketones such as the conversion of isopropanol to acetone and in many other similar conversions.

While it is not desired to be bound by any theory of operation, the following may be an explanation of the phenomena involved and may aid in a better understanding of the invention: It is apparent that, since the processes in which the improvement of the present invention takes place are processes wherein large amounts of air have been continually fed, the present treatment goes beyond the mere oxidation of organic matter on the catalyst by hot air as described in the aforementioned publications. Previous methods of cleaning the catalyst screens have also included mechanically abrading the screen surfaces until they were visibly shiny and clean. However, such prior methods of removal of carbon and the like from the screens did not give the used screens restored activity. Hence, it may be that the treatment described herein functions to release iron oxide occluded with carbon particles, particularly in the pores of the screen metal, as evidenced by the aforementioned analysis of the materials dusted off the screens by means of a compressed air hose. It may also be that the relatively uniform heating under the conditions described herein releases certain internal strains in the catalyst screens thereby lengthening and making more uniform the catalytic activity of the screens.

However, whatever be the action, we have found a method of treating catalyst materials which readily lends itself to commercial adoption with good results, even with unskilled operators. While the treatment of screens has been described, as this is a common commercial type material, other physical forms of material such as netting, open mesh work, rods, pellets, and the like may be treated in a similar manner, and with equally satisfactory results.

We claim:

1. A process of preparing a silver and copper screen catalyst which comprises fabricating the catalyst into the physical form of silver and copper screens from relatively pure high grade copper and silver, respectively, subjecting the screens to heating from 3 hours to 15 hours at a temperature between 500° F. and 1500° F., cooling, assembling a plurality of said screens into a stack, and slightly compressing the catalyst screens before use.

2. A process of preparing copper and silver catalyst screens which comprises subjecting the screens of the catalyst to heating between 3 hours to 15 hours at a temperature between 500° F. and 1500° F., cooling, assembling a plurality of said screens into a stack, and compressing the stack of catalyst screens before use to such an extent that the original height of the stack is reduced by 2–10%.

3. A process of making copper and silver screen catalyst which comprises treating copper and silver screens in an oxidizing atmosphere for 5 to 10 hours at a temperature between 500° F. to 1200° F., cooling the catalyst screens so treated, alternately stacking at least a portion of the copper and silver screens so that there are not more than six of either copper or silver screens adjacent one another, and compressing the screens so stacked prior to their use to such an extent that the original height of the stack is reduced by 2–10%.

4. A process of making copper and silver screen catalyst which comprises treating at least a portion of the copper and the silver screens in an oxidizing atmosphere for five to fifteen hours at a temperature between 500° F. to 1500° F., cooling the catalyst so treated, alternately stacking the copper and the silver screens so that generally there are not more than six of either copper or silver screens adjacent one another, and slightly compressing the screens so stacked prior to their use.

5. A process of making copper and silver screen catalyst which comprises treating copper and silver screens in an oxidizing atmosphere for five to fifteen hours at a temperature between 600° F. to 1100° F., cooling the catalyst screens so treated, and alternately stacking at least a portion of the copper and silver screens so that there are not more than six of either copper or silver screens adjacent one another.

EDWARD H. CARTER.
LOUIS E. SARTAIN.

REFERENCES CITED

The following references are of record in the file of this patent:

UNITED STATES PATENTS

| Number | Name | Date |
|---|---|---|
| Re. 20,370 | Lefort | May 18, 1937 |
| 1,043,580 | Eldred | Nov. 5, 1912 |
| 1,100,076 | Von Hochstetter | June 16, 1914 |
| 1,400,204 | Bockhaus | Dec. 13, 1921 |
| 1,425,576 | Clancy | Aug. 15, 1922 |
| 1,464,845 | Downs et al. | Aug. 14, 1923 |
| 2,049,246 | Brown | July 28, 1936 |
| 2,111,584 | Eversole | Mar. 22, 1938 |
| 2,245,183 | Christ et al. | June 10, 1941 |
| 2,249,367 | Vasser | July 15, 1941 |
| 2,384,066 | Balcar | Sept. 4, 1945 |